United States Patent Office 3,632,541
Patented Jan. 4, 1972

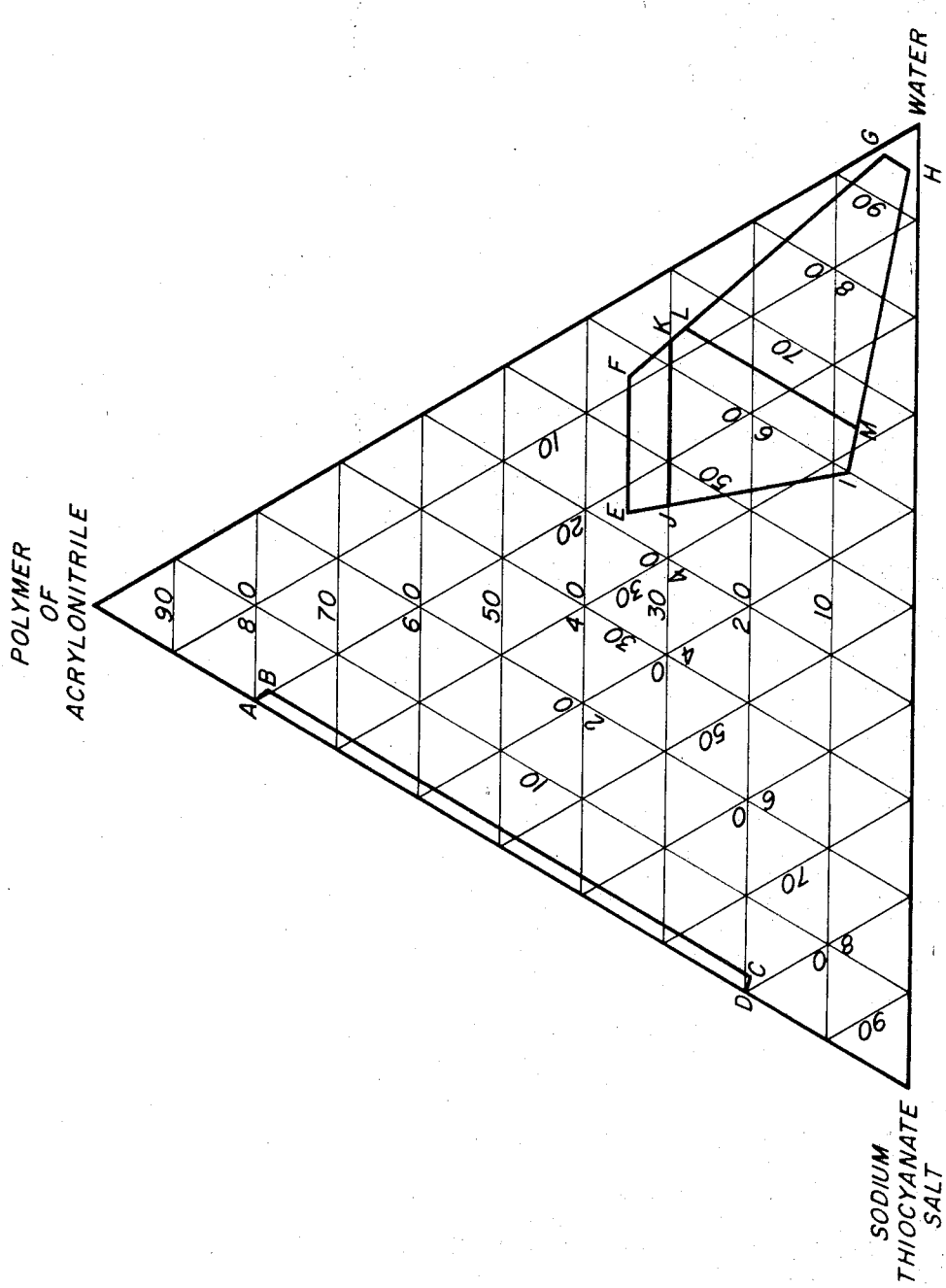

3,632,541
COMPOSITIONS AND PROCESSES FOR ACRYLO-
NITRILE POLYMER SPINNING SOLUTIONS
James B. Peeso, Jr., Stamford, Conn., assignor to American Cyanamid Company, Stamford, Conn.
Filed Oct. 13, 1967, Ser. No. 675,077
Int. Cl. C08f 3/76, 15/02, 45/24
U.S. Cl. 260—29.6 AB                       9 Claims

ABSTRACT OF THE DISCLOSURE

This invention relates to comminuted particles each comprising a polymer of acrylonitrile and a salt. The comminuted particles are prepared by first dispersing a polymer of acrylonitrile in an aqueous salt solution containing less than the critical concentration of salt. The dispersion is comminuted into finely divided droplets which are dried to leave the comminuted particles. Aqueous solutions of acrylonitrile polymers are prepared by mixing the comminuted particles with aqueous salt solutions or water to produce a polymer solution containing at least the critical concentration of salt.

---

This invention relates to comminuted compositions comprising a polymer of acrylonitrile and a salt and to methods for preparing and using the same. More particularly, this invention relates to a method for preparing comminuted compositions from an aqueous mixture of a polymer of acrylonitrile and a salt, the latter being present in less than the critical concentration and to the comminuted compositions so prepared. It relates further to the preparation of aqueous solutions from such comminuted compositions.

The term "critical concentration" as used herein refers to the minimum concentration of salt which, at a given temperature, is required to form with water an aqueous solvent for a polymer of acrylonitrile. The concentration of salt required to meet the "critical concentration" is temperature dependent, lower concentrations being required at higher solvent temperatures. It is also dependent, to some extent, on the nature and proportion of comonomers present in the polymer of acrylonitrile and the molecular weight of such polymer.

The term "polymer of acrylonitrile" as used herein refers to polymers which contain at least 70 percent polymerized acrylonitrile. The polymer of acrylonitrile can be homopolymeric or it can be a copolymer with at least one other ethylenically unsaturated comonomer. Illustrative of the numerous ethylenically unsaturated comonomers polymerizable with acrylonitrile are those mentioned in Coleman, U.S. Pat. 3,222,118, and Cummings, U.S. Pat. 2,948,581, and the various other patents referred to in each of these patents.

To use such polymers of acrylonitrile for forming shaped articles, such as fibers, it is conventional to dissolve them in suitable solvents. Such solvents include certain organic materials, such as dimethylformamide, dimethylacetamide, ethylene carbonate, etc., and concentrated aqueous solutions of certain salts, such as sodium thiocyanate, zinc chloride, calcium nitrate, etc. The present invention is exclusively concerned with these aqueous salt solvents. Illustrative of the salts which, in sufficiently concentrated aqueous solution, are useful as solvents for such polymers of acrylonitrile are those mentioned in Rein, U.S. Pat. 2,140,921, and the aforesaid Coleman patent. These water-soluble salts are ones which yield highly hydrated ions in aqueous solution. Also, mixtures of such salts may be used as disclosed in Stanton et al., U.S. Pats. 2,648,646 and 2,648,647. As used herein, the term "a salt" refers to such salts, or mixtures thereof, which, in sufficiently concentrated aqueous solution, act as solvents for polymers of acrylonitrile.

Several techniques have been proposed for preparing these solutions in an effort to reduce or minimize polymer degradation or discoloration caused by heat and to improve the uniformity of the solution. Polymers of acrylonitrile can be dispersed in the aqueous salt solvent by adding the polymer thereto while continually stirring and heating the resultant mixture until the polymer dissolves. Unfortunately, long periods of time are often required to dissolve uniformly the polymer in the aqueous medium. The longer the polymer is heated, the greater the chance of polymer discoloration. Attempts have been made to avoid this phenomenon by heating for shorter intervals. However, with prior techniques, heating for shorter time intervals was not adequate to dissolve fully the slow-dissolving polymer aggregates which remained dispersed and led to the production of non-acceptable products.

One of the methods presently employed to reduce heating time includes first cooling the aqueous salt solution to below the minimum temperature at which a salt solution of that particular concentration functions as a polymer solvent. This permits sufficient agitation to disperse the polymer therein before any polymer starts to dissolve. The dispersion is then heated to dissolve the polymer. Another method involves dispersing the polymer in an aqueous salt solution of a concentration insufficient to serve as a solvent and then adding salts to the dispersion in an amount sufficient to raise the salt concentration above the critical concentration and thus assist in dissolving the polymer at reduced temperatures. Though both techniques reduce the possibility of producing polymer aggregates and slightly reduce the time required at elevated temperatures to dissolve the polymer, unfortunately, neither method reduces the heating time sufficiently to completely eliminate incompletely dissolved polymer particles or solution discoloration. Another distinct disadvantage in these methods is that the maximum concentration of polymer in solution must be capable of being stirred while effecting dissolution of the polymer.

It is an object of the present invention to provide a comminuted solid composition containing a polymer of acrylonitrile which can be instantly dissolved on contact with aqueous solvents, giving polymer solutions having excellent color and uniformity.

It is a further object of the present invention to provide a process for preparing, in free-flowing comminuted solid form, an intimate mixture of a salt which forms with water a solvent for acrylonitrile polymers; and a polymer of acrylonitrile.

A still further object of the present invention is to provide an improved process for preparing aqueous solutions containing polymers of acrylonitrile.

Further objects of the present invention will become evident from the following description.

In accordance with the present invention, a polymer of acrylonitrile is first dispersed in an aqueous salt solution which solution contains less than the critical concentration of salt. The resultant dispersion is comminuted, as by atomizing, into finely divided droplets. The droplets are dried, leaving a uniform, comminuted, free-flowing solid comprising salt and a polymer of acrylonitrile. The comminuted particles may vary in size between about 1 micron and about 200 microns and more usually between about 4 microns and about 60 microns. When the comminuted solid is mixed with an aqueous medium, it dissolves to form a nearly colorless liquid solution which is both uniform and free of gelled agglomerates. The solutions can be obtained at normal room temperatures, without any external heating of either the solvent or the solid. Solutions having a polymer concentration as high as 75 weight percent can be obtained from the compositions of this invention.

The method for preparing the initial dispersion of polymer in the aqueous salt solution is not critical so long as the polymer of acrylonitrile is not dissolved in the salt solution. A suitable method for preparing the dispersion of polymer and salt solution involves mixing a salt solution, containing less than the critical concentration of salt, with an acrylonitrile polymer in crumb form. The mixture of polymer and solution is rapidly stirred or agitated to effect generally quick dispersion of the polymer particles.

The polymer of acrylonitrile can be introduced in any convenient form or manner to the salt solution. Though the polymer can be dry, preferably wet polymer containing from about 20 to about 50 percent by weight water can be employed. The use of wet polymer further reduces the possibility and tendency of a polymer to ball up and form agglomerates.

For the practice of this invention, use may be made of any salt which forms, with water, a solvent for polymers of acrylonitrile when above the critical concentration. All such salts known in the prior art can be used.

The dispersion of polymer and aqueous salt solution is atomized and the resultant droplets are subjected to heat to vaporize water. The water vapor is removed and the comminuted polymer-salt particles are recovered. To obtain the free-flowing comminuted compositions of this invention, it is essential that practically all of the water be removed. Minor quantities of water, i.e., up to about 2% by weight, can remain in the solid particles without seriously affecting the characteristics of the porduct. When more than about 2 weight percent water is present, the particles become sticky and are not free-flowing. The free-flowing properties are highly desirable when packaging the particles for storage or transporting the particles to other processing operation.

It has been found that conventional spray drying systems are ideally suited for producing comminuted particles having less than about 2 weight percent water. Spray drying is an almost instantaneous means of porducing dry product from a dispersion of the type described above. This is accomplished by reducing the mixture to a fine spray, mixing it with a stream of hot gas and then separating the drie dcomminuted particles from the gas. The gas supplies the heat for evaporation and carries off the moisture. Elapsed time for the whole operation is a matter of seconds. This reduces, to an absolute minimum, the time of polymer exposure to elevated temperatures. Consequently, the amount of polymer discoloration is also held to an absolute minimum. The gas temperature may vary but a temperature higher than that required for effective and economical operation should be avoided. Generally, gas inlet temperatures of about 250 to 300° C. have proven adequate. The dried particles can be air quenched either in the dryer or in the conveying duct work, or after product separation from the drying air stream, to minimize further discoloration. There are many variations of the spray drying technique which are known and any means can be employed wherein excess temperatures and excess drying times are avoided.

The comminuted particles are capable of being dissolved to from aqeous spinning solutions which can be spun into synthetic fibers. The comminuted particles without dilution are also capable of being shaped into useful products. For instance, filamentary materials can be made by subjecting the particles to pressure and heat which causes them to flow together to form a mass which can then be extruded though a dics or orifice.

To prepare an aqueous salt solution of polymer from the comminuted particles, care must be used in the selection of the diluent and in the manner of dilution. The diluent may be water or an aqueous salt solutions, most usually a solution of the salt found in the comminuted particles. To obtain all of the benefits of the present invention when preparing aqueous polymer solutions, it is essential that the dilution of the particles be accomplished in such a manner that polymer enter easily into aqueous solution and not be precipitated out of aqueous solution. At no time should the concentration of the salt in water associated with the polymer be less than the critical concentration for that particular salt. A preferred method of preparing the aqueous solution of polymer comprises dispersing the particles with suitable agitation into an aqueous solution having predissolved therein an amount of salt about equal to or slightly greater than the critical concentration. This ensures the absence of any local salt concentrations below the critical level and a final concentration above the critical level. The aqueous solution of polymer prepared by this method is gel-free and is obtained almost instantaneously at room temperature.

A less preferred but practical method is to disperse the comminuted particles in an aqueous salt solution where the concentration is substantially less than the critical concentration but such that the combined amount of salt both from the particies and the aqueous solution will be sufficient to be above the critical concentration. As temporary local salt concentration variations are likely in the water associated with the polymer, vigorous agiation is employed to minimize the amount and duration of such non-homogeneities sinec there might be a tendency for some polymer to be precipitated at these conditions if allowed to persist.

Another method of forming the aqueous solution of polymer, and particularly solutions of high polymer content, is to allow the comminuted particles to absorb the diluent since the grains are extremely hydroscopic. Again, the critical concentration must be taken into account. For instance, comminuted particles having a relatively high salt content can be exposed to plain water such as a humid atmosphere, steam or fog until the desired final composition is reached. In a similar manner, comminuted particles having lower salt content can be oversprayed or contacted with a foglike dispersion of a weak salt solution.

For a graphical depiction of one embodiment of this invention, reference is made to the accompanying drawing wherein the sole figure is a triangular coordinate plot of the system: water, sodium thiocyanate salt, and polymer of acrylonitrile.

On this plot, the compositions of the comminuted solid particles prepared in accordance with this embodiment of the invention are included within the area ABCD. Such compositions comprise 20% to 80% polymer of acrylonitrile and 80% to 20% sodium thiocyanate (for a total of 100% on a bone-dry basis) plus up to 2% water. Of course, such compositions may have other inert ingredients, such as delusterants, present.

The solid compositions are prepared, in accordance with the present invention, from a dispersion of polymer in an aqueous sodium thiocyanate solution, the composition of said dispersion being included within the area EFGHI, and preferaby within the area JKLMN. The useful dispersions comprise those containing (a) less than 35% sodium thiocyanate on a polymer-free basis, (b) a polymer-to-salt ratio between 0.25 and 4.0 (c) between 1% and 35% polymer, (d) between 42% and 95% water, and (e) between 1% and 32% sodium thiocyanate. The preferred dispersions comprise those containing (a) less than 35% sodium thiocyanate on a polymer-free basis, (b) a polymer-to-salt ratio between 0.25 and 4.0, (c) between 7% and 30% polymer, (d) between 45% and 65% water, and (e) between 7% and 32% sodium thiocyanate. It should be noted that the critical concentration of sodium thiocyanate in water at 25° C. is about 35%. However, the critical concentration is a function of molecular weight and acrylonitrile polymer composition. With other salts whose aqueous solutions dissolve polymers of acrylonitrile, the critical concentration for such salt would be the limiting condition which must not be exceeded by the polymer-salt-water dispersion. Other conditions are generally based on economic considerations, or operating limitations of equipment, or the desired product composition. Thus, generally, lower amounts of water are used since it must all be removed by heating.

The following examples are given by way of illustration and not by way of limitation in order that those skilled in the art may better understand the invention.

EXAMPLE 1

Two thousand parts of a copolymer containing 90% acrylonitrile and 10% methyl methacrylate having a moisture content of 50% was dispersed in an aqueous solution containing 1276 parts of sodium thiocyanate, 1826 parts of water and sufficient $Na_2S_2O_5$ (color inhibitor) to prepare a dispersion of 19.6% polymer, 25.0% NaCNS, 55.4% water which contained 0.088% $Na_2S_2O_5$. Sixty-six pounds of the mixture was pumped to the rotor of a conventional spray drier which atomized the mixture into the drying chamber. Simultaneously, air preheated to a temperature of about 250° C. was forced into the chamber and circulated to dry the atomized particles. Twenty-six pounds of dry product was obtained which consisted essentially of 43.6% polymer, 54.4% NaCNS and 0.8% water, the remainder being $Na_2S_2O_5$ and other undetermined materials. The product was characterized as free-flowing powder comminuted particles.

Fifty-eight parts of the comminuted particles were then dispersed with agitation into 42 parts of aqueous solution containing 30% NaCNS and 70% water. The grains immediately liquified into a clear colorless solution containing 25% polymer, 44.5% NaCNS and 30.5% water.

I claim:

1. A comminuted solid composition comprising, in each particle thereof, 20 to 80 weight percent of a polymer of acrylonitrile, and 80 to 20 weight percent of an inorganic salt which with water forms a solvent for said polymer, said composition containing not more than 2% water.

2. The composition of claim 1 wherein the salt is sodium thiocyanate.

3. The process for preparing the composition of claim 1 which comprises mixing said polymer in an aqueous solution of said salt containing less than the critical concentration of said salt required for dissolving said polymer to obtain a dispersion of polymer in said solution, comminuting said fluid dispersion, and dehydrating the comminuted dispersion.

4. The process of claim 3 wherein the dispersion composition comprises:
   (a) less than 35% sodium thiocyanate on a polymer-free basis;
   (b) a polymer-to-salt ratio between 0.25 and 4.0;
   (c) between 1% and 35% polymer;
   (d) between 42% and 95% water; and
   (e) between 1% and 32% sodium thiocyanate.

5. The process of claim 4 wherein the dispersion composition comprises between 7% and 30% polymer; between 45% and 65% water; and between 7% and 32% sodium thiocyanate.

6. The product produced by the process of claim 3.

7. The process for preparing an aqueous solution of a polymer of acrylonitrile which comprises mixing said polymer in an aqueous salt solution containing less than the critical concentration of salt required for dissolving said polymer to obtain a dispersion of polymer in said solution, atomizing said dispersion, evaporating water from said atomized dispersion to produce solids, and mixing said solids with water or aqueous salt solution to produce an aqueous polymer solution containing more than the critical concentration required for dissolving said polymer of an inorganic salt, which with water, forms a solvent for said polymer.

8. The process of claim 7 wherein the dispersion comprises:
   (a) less than 35% sodium thiocyanate on a polymer-free basis;
   (b) a polymer-to-salt ratio between 0.25 and 4.0;
   (c) between 1% and 35% polymer;
   (d) between 42% and 95% water; and
   (e) between 1% and 32% sodium thiocyanate.

9. The process of claim 8 wherein the dispersion comprises between 7% and 30% polymer; between 45% and 65% water; and between 7% and 32% sodium thiocyanate.

References Cited
UNITED STATES PATENTS

| | | | |
|---|---|---|---|
| 2,605,246 | 7/1952 | Cresswell et al. | 260—29.6 AI |
| 2,710,846 | 6/1955 | Dietrich et al. | 260—29.6 AI |

SAMUEL H. BLECH, Primary Examiner

H. ROBERTS, Assistant Examiner

U.S. Cl. X.R.

260—29.6 AN, 34.2, 85.5 P, S, 88.7 B, G; 264—182, 206

Case 22,137

UNITED STATES PATENT OFFICE
CERTIFICATE OF CORRECTION

Patent No. 3,632,541                    Dated January 4, 1972

Inventor(s)   James B. Peeso, Jr.

It is certified that error appears in the above-identified patent and that said Letters Patent are hereby corrected as shown below:

Col. 2, line 38 & 39, "polymer in solution must be capable" should read -- polymer in solution is materially restricted since the aqueous salt solution must be capable --.

Col. 3, line 31, "porduct" should read -- product --.

Col. 3, line 36, "operation" should read -- operations --.

Col. 3, line 40, "porducing" should read -- producing --.

Col. 3, line 44, "drie dcomminuted" should read -- dried comminuted --.

Col. 3, line 68, "dics" should read -- disc --.

Col. 4, line 20, "particies" should read -- particles --.

Col. 4, line 23, "agiation" should read -- agitation --.

Col. 4, line 25, "sinec" should read -- since --.

Col. 4, line 53, "The" should read -- These --.

Col. 4, line 57, "JKLMN" should read -- JKLMI --.

Signed and sealed this 4th day of July 1972.

(SEAL)
Attest:

EDWARD M. FLETCHER, JR.
Attesting Officer

ROBERT GOTTSCHALK
Commissioner of Patents

FORM PO-1050 (10-69)